June 18, 1929.   A. O. HURXTHAL ET AL   1,718,150
SPIKED FEED CONVEYER
Filed Jan. 10, 1928
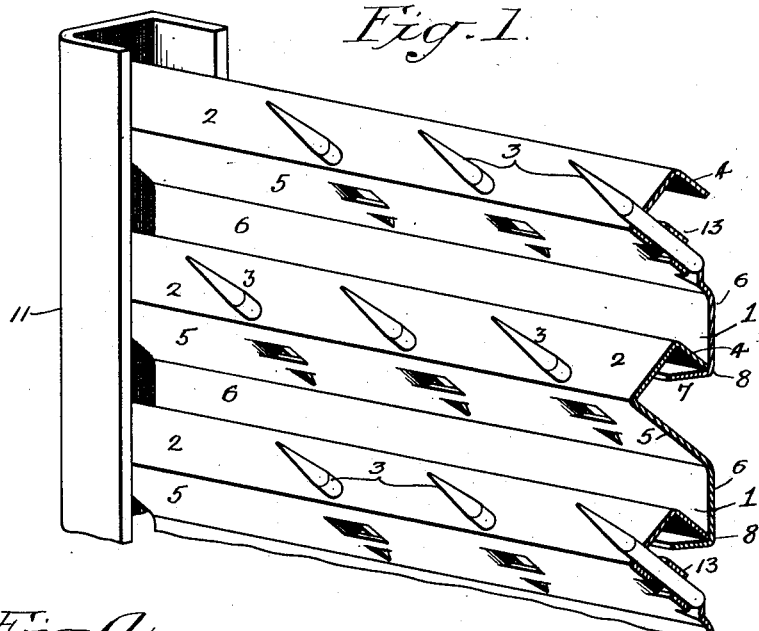
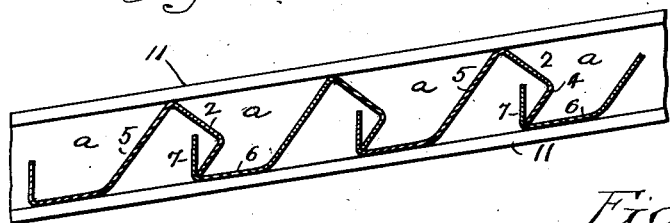
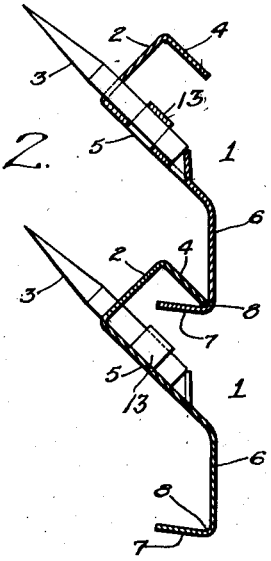
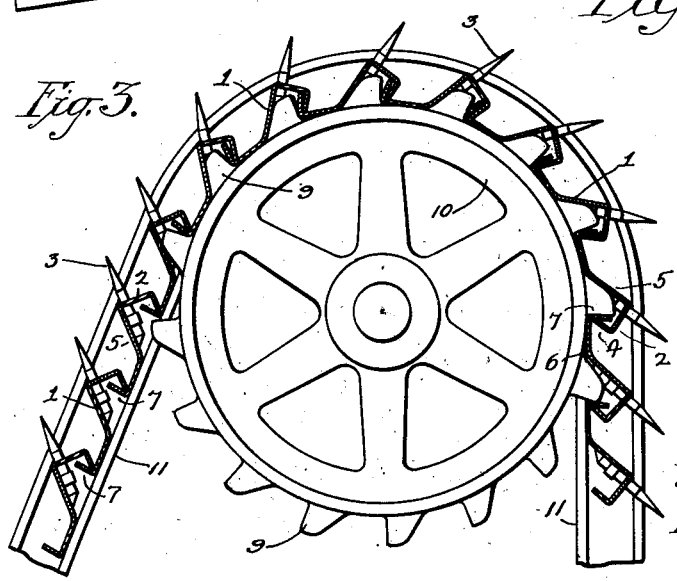
Inventors.
Alpheus O. Hurxthal,
Hermann Bogaty
by their Attorneys.

Patented June 18, 1929.

1,718,150

UNITED STATES PATENT OFFICE.

ALPHEUS O. HURXTHAL AND HERMANN BOGATY, OF PHILADELPHIA, PENNSYLVANIA, ASSIGNORS TO PROCTOR & SCHWARTZ, INCORPORATED, OF PHILADELPHIA, PENNSYLVANIA, A CORPORATION OF PENNSYLVANIA.

SPIKED FEED CONVEYER.

Application filed January 10, 1928. Serial No. 245,701.

Our invention relates to certain improvements in spiked feed conveyers, particularly adapted for feeding loose material, such as wool, to a machine, but it will be understood that our conveyer can be used for many different purposes and that it also can be used without spikes.

One object of our invention is to make the body of the conveyer of metal.

A further object of the invention is to so design the slats of the conveyer that they interlock, dispensing with the ordinary side chains usually employed.

A still further object is to so design the conveyer that a sprocket wheel or drum can be used to drive the conveyer.

The invention also relates to certain improvements in the means for securing the spikes to the slats.

In the accompanying drawings—

Figure 1 is a sectional perspective view of our improved spiked feed conveyer;

Fig. 2 is a side view;

Fig. 3 is a view showing the conveyer passing around a driving sprocket wheel; and Fig. 4 is a view of the conveyer in which the material is carried directly on the slats, the spikes being dispensed with.

Spiked conveyers, as usually constructed, are made of wooden slats connected together by side chains, and these chains pass around sprocket wheels, each slat being provided with a series of spikes which engage material and carry it up at an angle and discharge it into a hopper or onto a conveyer.

Wooden slats are objectional for many reasons, mainly that they are apt to break or warp.

The conveyer embodying our invention, which we will now describe, is made entirely of metal and the side chains are dispensed with.

Referring to the drawings, 1 are the slats which are made of metal, the body portion of each slat consisting of an inclined member 2 which is perforated for the reception of the spikes 3, a rocking member 4 which is at right angles to the member 2 in the present instance, and a member 5 which supports the body of the spike. The end of this member 5 is bent at an angle to form a guiding member 6 for the conveyer, the member 6 being also turned at an angle, preferably a right angle, to form a bearing portion 7 for a sprocket wheel.

The corner 8 formed by the parts 6 and 7 forms a socket for the edge of the rocking portion 4. When the slats are assembled, they interlock one with another and are held in this position by suitable guides 11 at each side of the conveyer structure. The slats articulate one on another and pass freely around a sprocket wheel or wheels 10. The sprocket wheel 10, Fig. 3, is a driving sprocket wheel for the conveyer, and the teeth 9 of the wheel engage the bearing portion 7 of the slats.

Each portion 2 of the slats of the conveyer is perforated at 12 for the passage of the spikes 3. The shank of each spike is held in position by a strap 13 formed by striking up the metal of the portion 5, as clearly shown in the drawings, while the spike is held from moving rearwardly by a stop 14, also formed by striking up the metal of said portion 5. This means of securing spikes to the slats is simple and allows the spikes to be held firmly in the slats.

In Fig. 4, we have shown a modification in which the spikes are dispensed with. In this type of conveyer the carrying run of the conveyer is at an incline or may be in a horizontal position, the slats forming pockets a in which the material lodges and the portions 2 and 4 acting as flights to positively move the material forward.

We claim:

1. The combination in a conveyer, of a series of metallic slats having interlocking joints, each slat being perforated; spikes located in the perforations; and means integral with the slats for holding the spikes in position.

2. The combination in a conveyer, of a series of interlocking slats, each slat being made of sheet metal bent into shape to form a perforated member through which the spikes extend; a rocking member at an angle to the perforated member; a spike supporting member also at an angle to the perforated member, said supporting member having an angular extension forming a guiding member; a bearing member for the tooth of a sprocket wheel bent from the guiding member; and spikes carried by said slats.

3. The combination in a conveyer, of a series of metallic slats having interlocking joints; spikes carried by the slats; and guides at each side of the conveyer for retaining the slats in proper alignment.

4. The combination in a conveyer, of a series of interlocking slats, each slat being made of sheet metal and bent into shape to form a longitudinal recess; and a sprocket wheel having teeth arranged to extend into the recess, the bearing portion of the preceding slat also forming the bearing for the tooth of the sprocket wheel which extends into the recess in the slat.

5. The combination in a conveyer, of a series of metallic slats having interlocking joints, each slat being perforated; spikes located in the perforations; straps formed integral with the slat extending around the shank of the spike; and an integral stop bearing against the rear end of the spike, preventing rearward movement of said spike.

6. The combination in a conveyer, of a series of metal slats, each slat having a recess for the reception of the teeth of a sprocket wheel, said slat having a guiding member for the conveyer, the end of said guiding member being turned at an angle to form a bearing portion for the teeth of the sprocket wheel and also to form a socket for the rocking portion of a succeeding tooth, the forward end of the slat being bent to form a rocking member arranged to rock in the socket of the preceding tooth.

ALPHEUS O. HURXTHAL.
HERMANN BOGATY.